(12) United States Patent
Morimoto

(10) Patent No.: US 8,780,836 B2
(45) Date of Patent: Jul. 15, 2014

(54) NETWORK SYSTEM, CONTROLLER, AND NETWORK CONTROL METHOD

(75) Inventor: Masaharu Morimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 277 days.

(21) Appl. No.: 13/277,779

(22) Filed: Oct. 20, 2011

(65) Prior Publication Data

US 2012/0039338 A1    Feb. 16, 2012

Related U.S. Application Data

(63) Continuation of application No. PCT/JP2010/072621, filed on Dec. 16, 2010.

(30) Foreign Application Priority Data

Jan. 5, 2010    (JP) .................................. 2010-000459

(51) Int. Cl.
*H04W 4/00*    (2009.01)

(52) U.S. Cl.
USPC .......................................... 370/329; 370/392

(58) Field of Classification Search
USPC ......... 370/329, 392, 401, 349, 352, 356, 371, 370/383, 389, 471, 474, 395.31, 395.3; 709/205, 214; 728/28

See application file for complete search history.

(56) References Cited

FOREIGN PATENT DOCUMENTS

JP    2004-289806 A    10/2004

OTHER PUBLICATIONS

International Search Report in PCT/JP2010/072621 dated Mar. 29, 2011 (English Translation Thereof).
Nick McKeown, et al., "OpenFlow: Enabling Innovation in Campus Networks", ACM SIGCOM Computer Communication Review, vol. 38, No. 2, 2008.
Iljima,et al.,"Cloud Computing Jidai no Data Center to Network no Shoene Gijutsu" NEC Technical Journal, 2009.09, vol. 62, No. 3, pp. 117-120.
Ueno, et al., "A Study on Deployment of Network Applicane Functionalities in Datacenter Network", IEICE Technical Report CPSY2009-36, Nov. 13, 2009, vol. 109, No. 296, pp. 7-12.

*Primary Examiner* — Chi Pham
*Assistant Examiner* — Alexander O Boakye
(74) *Attorney, Agent, or Firm* — McGinn IP Law Group, PLLC

(57) ABSTRACT

A switch transfers a predetermined packet to an appliance. The appliance generates a rewritten packet by carrying out the packet header rewriting on the predetermined packet and forwards the rewritten packet back to the switch. The switch transfers the rewritten packet received from the appliance to a controller. In a case when the rewritten packet meets a predetermined condition, the controller generates entry setting data which instructs to set a new entry on the basis of a destination of the rewritten packet and the predetermined rewriting mode, and sends the entry setting data to the switch. The new entry indicates that packets belonging to the same flow as the predetermined packet are transferred to the destination without being routed through the appliance. The switch adds the new entry to the flow table in accordance with the entry setting data received from the controller.

20 Claims, 17 Drawing Sheets

Fig. 5

SCM:HORTCUT MANAGEMENT INFORMATION

- APPLIANCE NAME
- CONNECTION PORT
- PACKET HEADER CONVERSION MODE
- SHORTCUT APPLICATION TIMING

Fig. 11

| ID | Priority | IN PORT | MAC DST | MAC SRC | PROTO | IP SRC | IP DST | Src L4Port | Dst L4Port | Action |
|---|---|---|---|---|---|---|---|---|---|---|
| 1 | 0 | * | * | * | TCP | * | VIP | * | 80 | output port 4 |
| 0 | 0 | 4 | * | * | TCP | * | VIP | * | 80 | output Controller |

ENT-D1 (ID 1)
ENT-D2 (ID 0)

Fig. 12

| ID | Priority | IN PORT | MAC DST | MAC SRC | PROTO | IP SRC | IP DST | Src L4Port | Dst L4Port | Action |
|---|---|---|---|---|---|---|---|---|---|---|
| 3 | 100 | 2 | VMAC | MAC1 | TCP | IP1 | VIP | p0 | 80 | MAT<br>MAC DST < MACa |
| 2 | 100 | 2 | VMAC | MAC1 | TCP | IP1 | VIP | p0 | 80 | output port 5 |
| 1 | 0 | * | * | * | TCP | * | VIP | * | 80 | output port 4 |
| 0 | 0 | 4 | * | * | TCP | * | VIP | * | 80 | output Controller |

ENT-HC — (ID 3)
ENT-TR — (ID 2)
ENT-D1 — (ID 1)
ENT-D2 — (ID 0)

Fig. 14

| ID | Priority | IN PORT | MAC DST | MAC SRC | PROTO | IP SRC | IP DST | Src L4Port | Dst L4Port | Action |
|---|---|---|---|---|---|---|---|---|---|---|
| 1 | 0 | * | * | * | TCP | * | VIP | * | 80 | output port 4 |
| 0 | 0 | 8 | * | * | TCP | * | VIP | * | 80 | output Controller |

ENT-D1 (row ID 1)
ENT-D2 (row ID 0)

Fig. 15

| ID | Priority | IN PORT | MAC DST | MAC SRC | PROTO | IP SRC | IP DST | Src L4Port | Dst L4Port | Action |
|---|---|---|---|---|---|---|---|---|---|---|
| 5 | 100 | 5 | VMAC2 | MACa | TCP | IPa | IP1 | P0 | 10080 | MAT MAC DST ← MAC1<br>MAT MAC SRC ← VMAC<br>NAPT IP SRC ← VIP2<br>PORT SRC ← 80 |
| 4 | 100 | 5 | VMAC2 | MACa | TCP | IPa | VIP2 | 80 | p0 | output port 2 |
| 3 | 100 | 2 | VMAC | MAC1 | TCP | IP1 | VIP | p0 | 80 | MAT MAC DST ← MACa<br>MAT MAC SRC ← VMAC2<br>NAPT IP DST ← IPa<br>PORT DST ← 10080 |
| 2 | 100 | 2 | VMAC | MAC1 | TCP | IP1 | VIP | p0 | 80 | output port 5 |
| 1 | 0 | * | * | * | TCP | * | VIP | * | 80 | output port 4 |
| 0 | 0 | 8 | * | * | TCP | * | VIP | * | 80 | output Controller |

ENT-HC2 (ID 5), ENT-TR2 (ID 4), ENT-HC1 (ID 3), ENT-TR1 (ID 2), ENT-D1 (ID 1), ENT-D2 (ID 0)

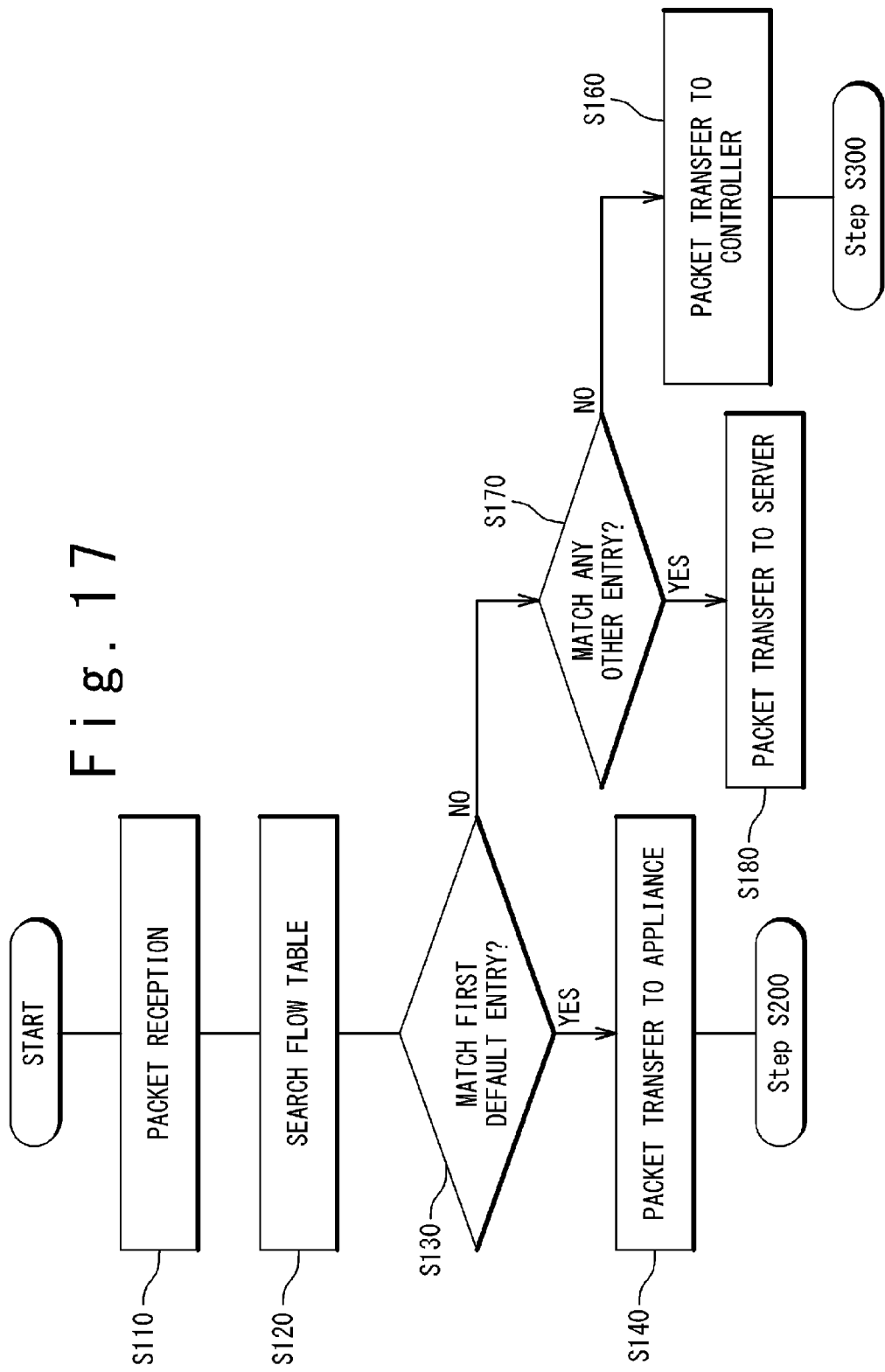

NETWORK SYSTEM, CONTROLLER, AND NETWORK CONTROL METHOD

CROSS-REFERENCE TO RELATED APPLICATION

This application is a continuation of International Application No. PCT/JP2010/072621, filed on Dec. 16, 2010.

BACKGROUND OF THE INVENTION

1. Field of the Invention The present invention relates to a network system and a control method thereof. More specifically, the present invention relates to a network system including an appliance having a packet header rewriting function and a control method thereof.

2. Description of the Related Art

A network control protocol named "OpenFlow" is disclosed in Nick McKeown et al., "OpenFlow: Enabling Innovation in Campus Networks", ACM SIGCOMM Computer Communication Review, Vol. 38, No. 2, 2008. (http://www.openflowswitch.org//documents/openflow-wp-latest.pdf). In the OpenFlow protocol, a path control, a failure recovery, a load distribution, and optimization are carried out in increments of flows. In the OpenFlow protocol, OpenFlow switches which serve as transfer nodes, and an OpenFlow controller which controls the OpenFlow switches are used.

An OpenFlow switch is provided with a flow table indicating a correlation between "matching conditions" and "actions", and operates in accordance with the flow table. Specifically, an OpenFlow switch refers to the flow table upon reception of a packet, and searches the flow table for an entry matching the received packet. When an entry that matches the received packet is registered in the flow table, the OpenFlow switch executes an action specified by the matching entry on the received packet. Typically, the OpenFlow switch transfers the received packet to an output port specified by the action.

The OpenFlow controller sets contents of the flow tables of OpenFlow switches. More specifically, the OpenFlow controller gives instructions, such as an addition of a new entry, a change of an entry, and a deletion of an entry, to OpenFlow switches, and thereby controls the operations of the Open-Flow switches. The network traffic can be controlled by controlling the operations of the OpenFlow switches.

Furthermore, "appliances (network appliances)" are generally known which carries out particular processes on the network traffic. Examples of the appliance include a load balancer and a firewall. For example, a load balancer in the layer 4 selects one out of a plurality of servers upon reception of the first packet of a certain flow. Then, the load balancer appropriately rewrites header information of the packet, and transfers the rewritten packet to the selected server. Such rewriting of the header information of a packet is hereinafter referred to as "packet header rewriting". Upon reception of packets belonging to the same flow, the load balancer similarly carries out the packet header rewriting on the received packets and then transfers the rewritten packets to the selected server. This achieves distribution of the load among servers.

SUMMARY OF INVENTION

The inventor has noted the following aspects: a switch would be able to take over a process to be done by an appliance, if a packet header rewriting can be carried out by the appliance is set as an entry in the flow table. In other words, it would be possible to control the traffic originally routed through a certain appliance so as not to be routed through the appliance after a certain timing. Such a traffic control is hereinafter referred to as "shortcut".

In order to achieve a shortcut with regard to a traffic routed through a certain appliance, a switch needs to know details of a process to be carried out within the appliance in regard to packets. In general, however, appliances are black box products, so that it is difficult for the switch to obtain information on the process to be carried out within the appliance.

For example, the load balancer selects one of a plurality of servers upon reception of the first packet of a certain flow. When then receiving packets belonging to the same flow, the load balancer carries out a packet header rewriting on received packets and transfers the rewritten packets to the selected server. In order to achieve a shortcut with regard to the traffic routed through this load balancer, a switch needs to know at least the server selected by the load balancer. Only the load balancer, however, can know the information on the selected server. In general, the load balancer is a black box product, so that it is difficult for the switch to know the server selected by the load balancer. If it is tried to forcedly obtain such information, this requires modifying the operation of the load balancer, by adding an API (application program interface), for example. This causes problems, such as a violation of license and an increase in cost.

An objective of the present invention is to achieve a shortcut with regard to a traffic routed through an appliance without modifying the operation of the appliance.

In an aspect of the present invention, a network system is provided. The network system includes an appliance, a controller and a switch connected to the appliance and the controller. The appliance is adapted to perform a packet header rewriting for rewriting header information of packets in accordance with a predetermined rewriting mode. The controller includes a storage unit in which shortcut management information indicating the predetermined rewriting mode and a predetermined condition is stored. The switch includes a flow table. Each entry in the flow table specifies an action to be carried out on a packet matching a matching condition. The switch is adapted to refer to the flow table upon receiving a packet and to perform an action specified by an entry that matches the received packet on the received packet.

In a shortcut setting process, the switch transfers a predetermined packet to the appliance. The appliance generates a rewritten packet by carrying out the packet header rewriting on the predetermined packet and forwards the rewritten packet back to the switch. The switch transfers the rewritten packet received from the appliance to the controller. The controller refers to the shortcut management information in response to the rewritten packet. In a case when the rewritten packet meets the predetermined condition, the controller generates entry setting data which instructs to set a new entry on the basis of a destination of the rewritten packet and the predetermined rewriting mode, and sends the entry setting data to the switch. Here, the new entry indicates that packets belonging to the same flow as the predetermined packet are transferred to the destination without being routed through the appliance. The switch adds the new entry to the flow table in accordance with the entry setting data received from the controller.

In another aspect of the present invention, a controller is provided which controls a network in which a switch and an appliance are provided. The switch includes a flow table. Each entry in the flow table specifies an action to be carried out on a packet matching a matching condition. The switch is adapted to refer to the flow table upon receiving a packet and to perform an action specified by an entry that matches the received packet on the received packet. The switch is adapted to set an entry of the flow table in accordance with entry setting data received from the controller. The appliance is adapted to perform a packet header rewriting for rewriting header information of packets in accordance with a predetermined rewriting mode. In a shortcut setting process, the switch transfers a predetermined packet to the appliance. The appliance generates a rewritten packet by carrying out the packet header rewriting on the predetermined packet and forwards the rewritten packet back to the switch. The switch transfers the rewritten packet received from the appliance to the controller.

The controller according to the present invention includes: a storage unit in which shortcut management information indicating the predetermined rewriting mode and a predetermined condition is stored; and a processing unit performing a switch setting process in the shortcut setting process. In the switch setting process, the processing unit refers to the shortcut management information in response to the rewritten packet. In a case when the rewritten packet meets the predetermined condition, the processing unit generates entry setting data which instructs to set a new entry on the basis of a destination of the rewritten packet and the predetermined rewriting mode, and sends the entry setting data to the switch. The new entry indicates that packets belonging to the same flow as the predetermined packet are transferred to the destination without being routed through the appliance.

In still another aspect of the present invention, a "control method" of a network in which a switch and an appliance is provided is provided. The switch includes a flow table. Each entry in the flow table specifies an action to be carried out on a packet matching a matching condition. The switch is adapted to refer to the flow table upon receiving a packet and to perform an action specified by an entry that matches the received packet on the received packet. The appliance is adapted to perform a packet header rewriting for rewriting header information of packets in accordance with a predetermined rewriting mode.

The above-described "control method" according to the present invention includes: (A) transferring a predetermined packet from the switch to the appliance; (B) generating a rewritten packet in the appliance by carrying out a packet header rewriting on the predetermined packet to forward the rewritten packet back to the switch; (C) obtaining the rewritten packet from the switch; (D) reading shortcut management information indicating the predetermined rewriting mode and a predetermined condition from a storage device, in response to the rewritten packet; (E) generating entry setting data which instruct to set a new entry based on a destination of the rewritten packet and the predetermined rewriting mode when the rewritten packet meets the predetermined condition, wherein the new entry indicates that a packet belonging to the same flow as the predetermined packet is transferred to the destination without being routed through the appliance; (F) sending the entry setting data to the switch; and (G) adding the new entry to the flow table in accordance with the entry setting data, in the switch.

In still another aspect of the present invention, a non-transitory recording medium is provided which records a control program that causes a computer to perform a control process of a network in which a switch and an appliance is provided. The switch includes a flow table. Each entry in the flow table specifies an action to be carried out on a packet matching a matching condition. The switch is adapted to refer to the flow table upon receiving a packet and to perform an action specified by an entry that matches the received packet on the received packet. The appliance is adapted to perform a packet header rewriting for rewriting header information of packets in accordance with a predetermined rewriting mode. In a shortcut setting process, the switch transfers a predetermined packet to the appliance. The appliance generates a rewritten packet by carrying out the packet header rewriting on the predetermined packet and forwards the rewritten packet back to the switch. The switch transfers the rewritten packet received from the appliance to the controller.

The "control process" according to the present invention includes: (a) reading shortcut management information indicating the predetermined rewriting mode and a predetermined condition from a storage device, in response to the rewritten packet; (b) generating entry setting data which instruct to set a new entry based on a destination of the rewritten packet and the predetermined rewriting mode when the rewritten packet meets the predetermined condition, wherein the new entry indicates that a packet belonging to the same flow as the predetermined packet is transferred to the destination without being routed through the appliance; and (c) sending the entry setting data to the switch.

The present invention makes it possible to achieve a shortcut with regard to a traffic routed through an appliance without remodeling of the appliance.

BRIEF DESCRIPTION OF THE DRAWINGS

The above-mentioned and other objects, advantages, and characteristics will be further clarified by embodiments of the present invention described along with the following drawings:

FIG. 5 is a conceptual diagram showing shortcut management information in the present embodiment;

FIG. 11 shows the initial status of a flow table in the first example;

FIG. 12 shows the status of the flow table in the first example;

FIG. 14 shows the initial status of a flow table in the second example;

FIG. 15 shows the status of the flow table in the second example;

FIG. 17 is a flow chart showing a modified example of the present embodiment.

DESCRIPTION OF PREFERRED EMBODIMENTS

Embodiments of the present invention will be described referring to attached drawings.

1. Configuration

Figure 1:
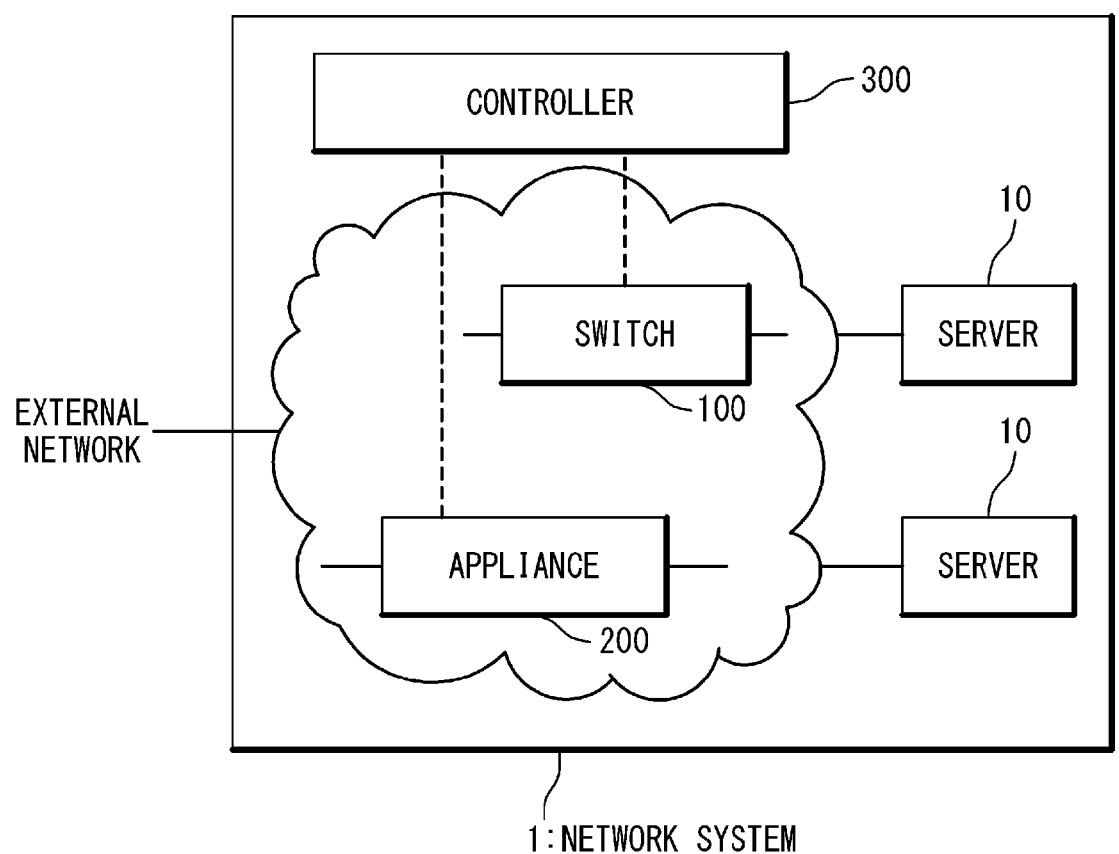
FIG. 1 is a block diagram schematically showing the configuration of a network system according to an embodiment of the present invention.

FIG. 1 schematically shows the configuration of a network system 1 according to an embodiment. The network system 1 according to the present embodiment is applied to, for example, a data center.

The network system 1 includes a server 10, switches 100 (one shown), appliances 200 (one shown), and a controller 300. The switches 100 and the appliances 200 constitute a switch-appliance network. The server 10 is connected to the switch-appliance network. The switch-appliance network is further connected to an external network outside of the network system 1.

1-1. Switch 100

Figure 2:
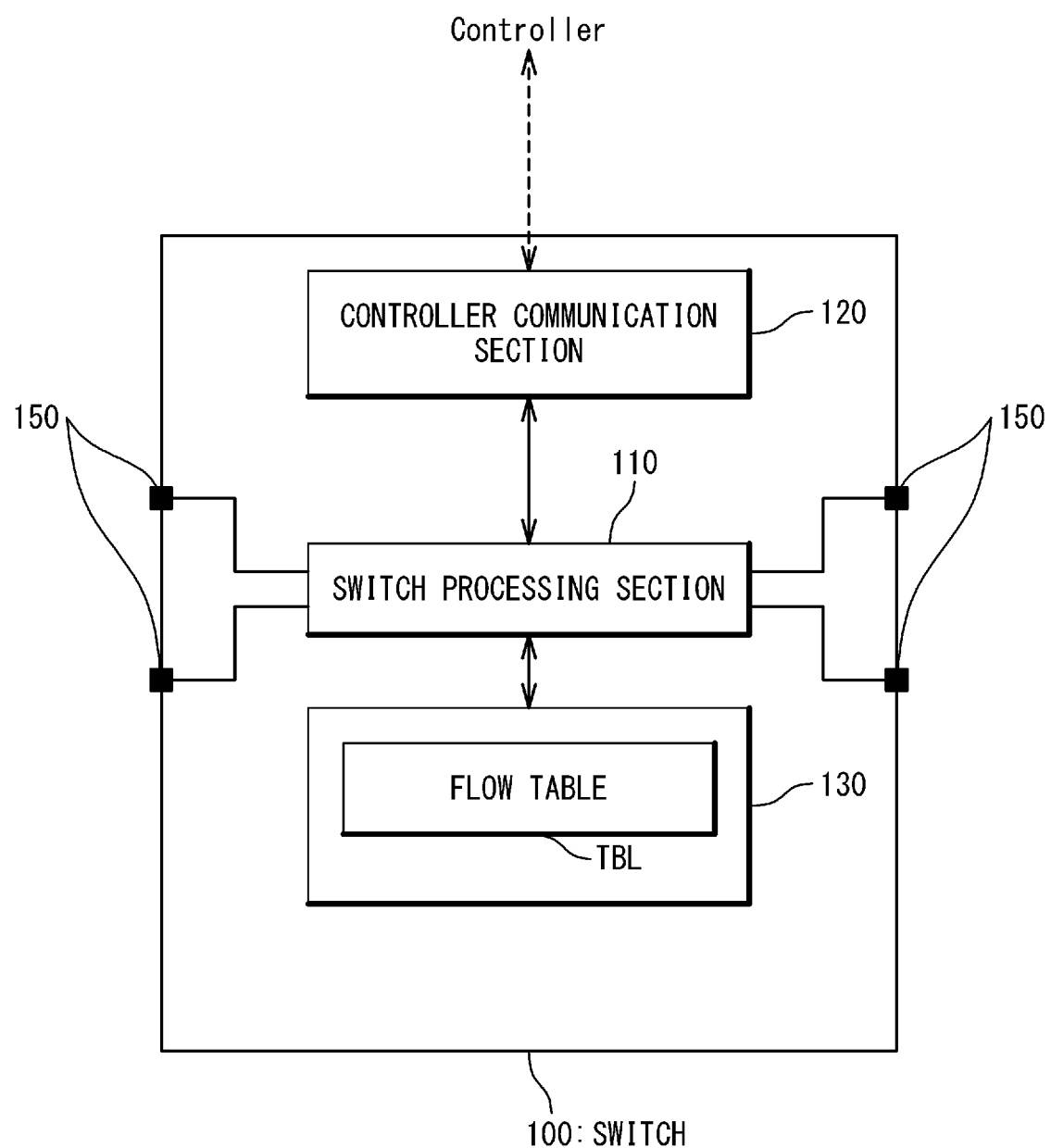
FIG. 2 is a block diagram showing the configuration of a switch according to the present embodiment.

The switches 100 execute switch processes such as a packet transfer. More specifically, the switches 100 each includes a switch processing section 110, a controller communication section 120, a storage unit 130, and a plurality of ports 150, as shown in FIG. 2. A port 150 to which a packet is inputted from the outside is referred to as input port, and a port 150 from which a packet is outputted to the outside is referred to as output port. The switch processing section 110 carries out main packet processes such as a packet transfer from an input port to an output port. The controller communication section 120, which is connected to a controller 300 via a control line, serves as an interface in communicating with the controller 300.

Figure 3:
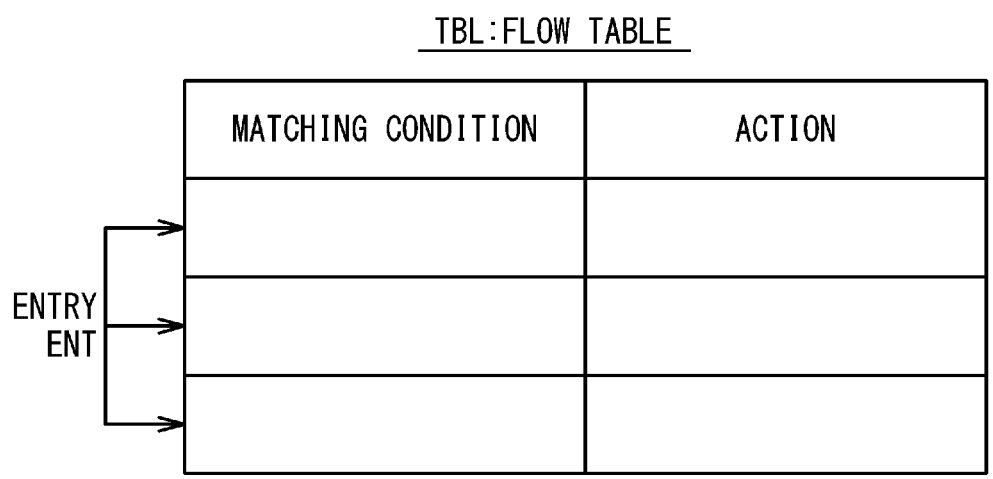
FIG. 3 is a conceptual diagram showing a flow table in the present embodiment.

The storage block 130 stores a flow table TBL as shown in FIG. 3. Each entry ENT in the flow table TBL indicates a "matching condition (flow identification information)" and an "action". The "matching condition" is composed of a combination of parameters, including an input port of a packet, a source MAC address, a destination MAC address, VLAN ID, a source IP address, a destination IP address, a source port number, a destination port number and the like. It should be noted that the flow is also identified by the combination of those parameters. That is, the "matching condition" is also flow identification information that specifies a flow. The "action" designates a process to be carried out on a packet matching the matching condition. Examples of the "action" include an output of a packet to a specified port, discarding of a packet, and the like.

The switch processing section 110 refers to the flow table TEL stored in the storage block 130 upon reception of a packet through the input port. The switch processing section 110 then searches the flow table TEL for an entry ENT matching the received packet. Specifically, the switch processing section 110 extracts header information of the received packet, and carries out a search of the flow table TEL by using the input port and the header information of the received packet as search keys. The matching entry that matches the received packet is determined as the entry ENT indicating the matching condition which matches those search keys. When the received packet matches the matching condition of any of the entries ENT, namely, when a match entry is found, the switch processing section 110 carries out an "action" specified by that match entry on the received packet.

1-2. Appliance 200

The appliances (network appliances) 200 are network device that execute particular processes on the network traffic. Examples of the appliances 200 include a load balancer and a firewall. In the present embodiment, the appliances 200 each carry out a "packet header rewriting" in which header information of a packet is rewritten in accordance with a predetermined rewriting mode.

As one example of the appliances 200, let us consider an L4 load balancer having a Direct Server Return (DSR) configuration. The load balancer selects one of a plurality of servers upon reception of the first packet of a certain flow. Then, the load balancer rewrites the destination MAC address in the header of the packet to the "MAC address of the selected server". This type of rewriting mode is referred to as MAC Address Translation (MAT). When then receiving packets belonging to the same flow, the load balancer carries out similar packer header rewritings on the received packet, and transfers the rewritten packets to the selected server.

The predetermined rewriting modes may include a Network Address Translation (NAT) and a Network Address Port Translation (NAPT), other than the MAT mode described above. For the NAT mode, the appliance 200 rewrites the source IP address or the destination IP address in the header of a packet to the IP address of the selected server. For the NAPT mode, the appliance 200 rewrites the L4 port number, in addition to those rewritten in the case of the NAT mode.

1-3. Controller 300

The controller 300 controls the traffic in the network. The controller 300 is connected to each switch 100 and each appliance 200 arranged in the network via control lines (shown by broken lines in FIG. 1). The controller 300 receives information from the switches 100 and the appliances 200 via the control lines, and controls the switches 100 and the appliances 200 via the control lines.

For example, the controller 300 has a function of setting contents of the flow table TEL of each switch 100 via the control line. Specifically, the controller 300 generates "entry setting data" which instruct to set an entry ENT (for example, addition, change, and deletion), and sends the entry setting data to a target switch 100. The switch 100 which receives the entry setting data carries out the setting of the entry ENT (for example, addition, change, and deletion) in its own flow table TBL in accordance with the entry setting data. As described above, the controller 300 controls the operation of the switch 100 by setting of the contents of the flow table TEL, and thus can appropriately control the network traffic.

An example of the interface method between the controller 300 and the switches 100 for achieving such process is Openflow (refer to http://www.openflowswitch.org/). In this case, an "Openflow controller" is used as the controller 300, and "Openflow switches" are used as the respective switches 100.

Figure 4:
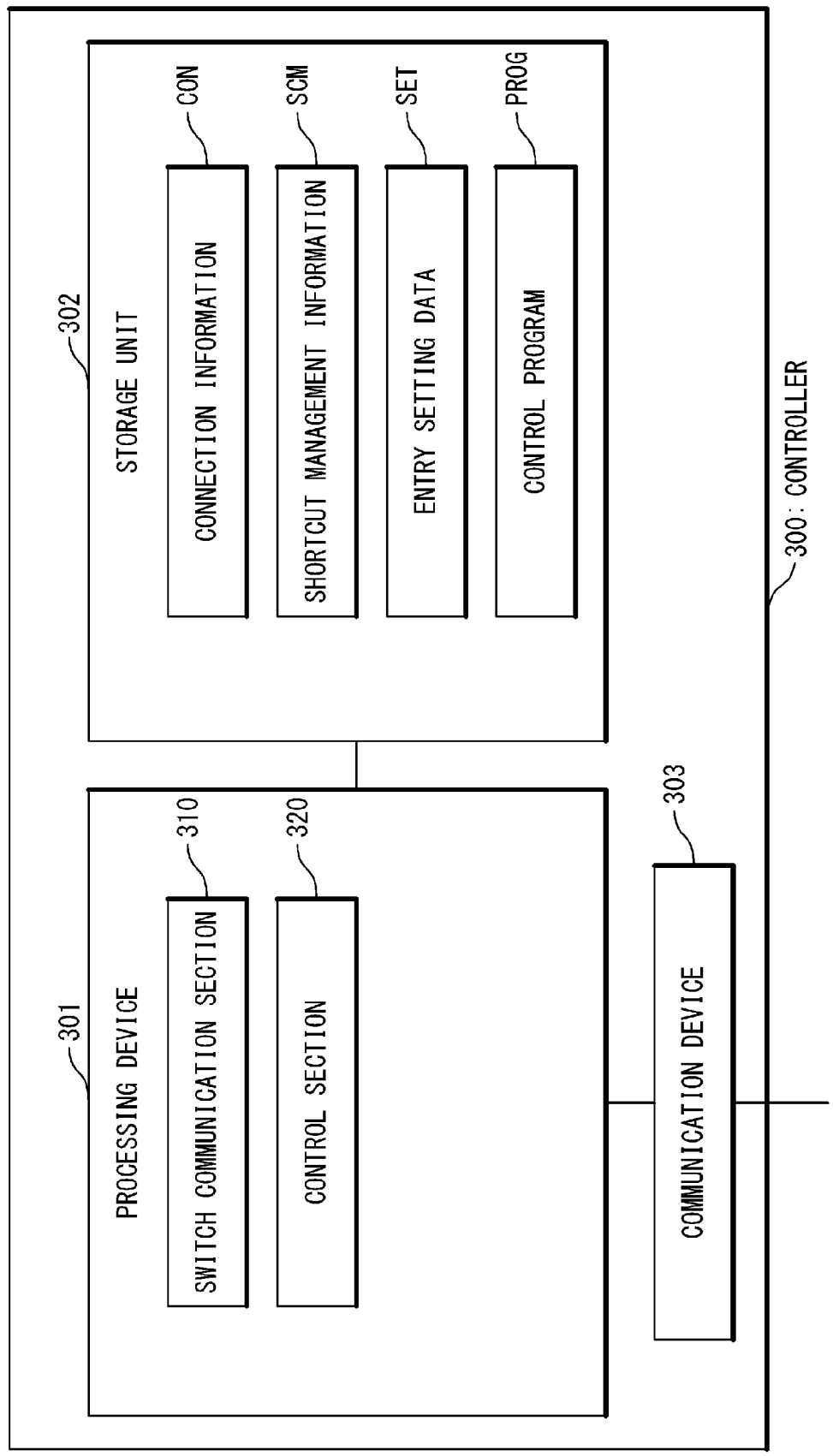
FIG. 4 is a block diagram showing the configuration of a controller according to the present embodiment.

FIG. 4 is a block diagram showing the configuration of the controller 300 according to the present embodiment. The controller 300 includes a processing unit 301, a storage unit 302, and a communication device 303. The processing unit 301 includes a Central Processing Unit (CPU). The storage unit 302 may include, for example, a random access memory (RAM) and a hard disk drive (HDD). The communication device 303 may include, for example, a network card for carrying out a communication to and from the outside.

The storage unit 302 stores connection information CON, shortcut management information SCM, entry setting data SET and the like. As described above, the entry setting data SET are information which instructs to set the entry ENT (for example, addition, change, and deletion) to a target switch 100.

The connection information CON indicates connections in the network. That is, the connection information CON indicates the connections (or the topology) among components such as the servers 10, the switches 100, and the appliances 200. More specifically, the connection information CON indicates which port of which component each port of each component is connected to. The identification information of each component may include a MAC address, an IP address and the like.

The shortcut management information SCM is used in performing a "shortcut setting process" described below. FIG. 5 schematically shows the shortcut management information SCM in the present embodiment. As shown in FIG. 5, the shortcut management information SCM includes pieces of information as follows for each appliance 200: (1) identification information on the appliance 200, typically the appliance name; (2) a port to which the appliance 200 is connected; (3) a packet header rewriting mode in the appliance 200; and (4) shortcut application timing. Examples of the packet header rewriting mode include the above-described MAT mode, the NAT mode, and the NAPT mode.

The shortcut application timing is the timing for applying a "shortcut" to a traffic routed through the appliance 200 (a predetermined condition). In other words, when a predetermined condition represented by this shortcut application timing is satisfied, the "shortcut" is implemented in regard to the traffic routed through the appliance 200.

As one example, let us consider the load balancer described above. The load balancer selects one of the plurality of servers upon reception of the first packet in a certain flow. Then, the load balancer carries out a packet header rewriting based on the address of the selected server. Therefore, it is preferable that the shortcut application timing is set to "the timing when the first packet of a certain flow is received."

As another example, let us consider a firewall that carries out a stateful operation. The firewall passes therethrough, for example, only packets in flows for which a TCP 3-way handshaking is completed. In this case, upon reception of a TCP synchronize-acknowledgement (SYN-ACK) packet, the firewall determines that the following packets of the relevant flow are permitted to pass therethrough. Therefore, it is preferable that the shortcut application timing is set to "the timing when a TCP SYN-ACK packet is received."

The processing unit 301 carries out the network control process according to the present embodiment. More specifically, the processing unit 301 includes a switch communication section 310 and a control section 320, as shown in FIG. 4. Those function sections are achieved by executing a control program PROG by the processing unit 301. The control program PROG is a computer program executed by the computer (the processing unit 301), which is stored in the storage unit 302. The control program PROG may be stored in a computer-readable recording media.

2. Process

2-1. Initial Setting Process

Figure 6:
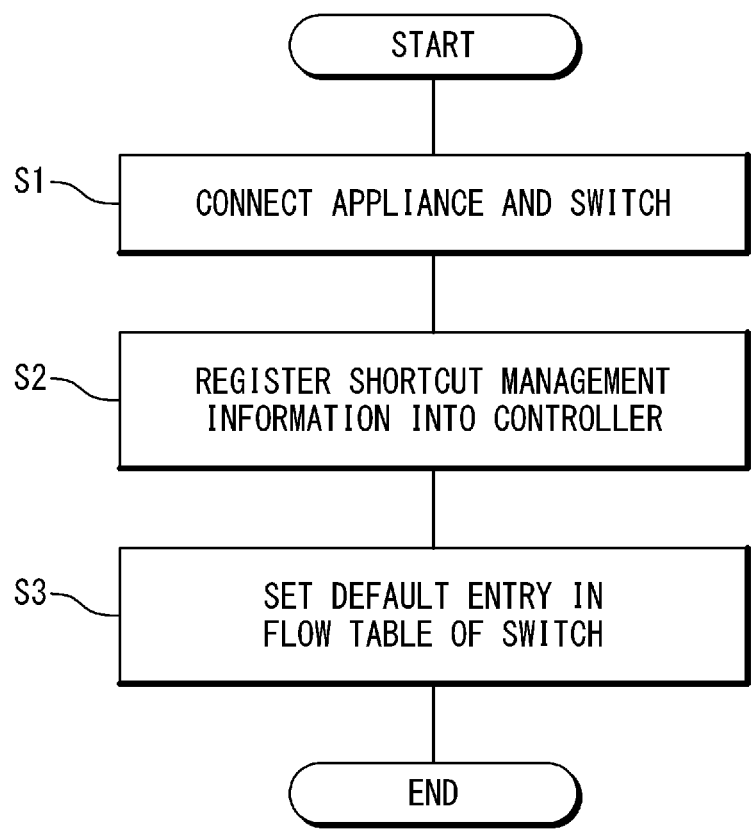
FIG. 6 is a flow chart showing an initial setting process according to the present embodiment.

FIG. 6 is a flow chart showing an initial setting process according to the present embodiment. In the initial setting process, an appliance 200 is newly added to the network by the operator. The newly added appliance 200 is hereinafter referred to as target appliance 200".

Step S1:
The operator physically connects the target appliance 200 to any of the switches 100 in the network. The switch 100 to which the target appliance 200 is connected is hereinafter referred to as "target switch 100". The controller 300 updates the connection information CON by using, for example, the Link Layer Discovery Protocol (LLDP) defined in IEEE802.1AB.

Step S2:
The operator generates shortcut management information SCM regarding the target appliance 200, and the generated shortcut management information SCM is stored in the storage unit 302 of the controller 300. The packet header rewriting mode described therein is one that is to be used in the target appliance 200, selected out of the MAT mode, the NAT mode and the NAPT mode described above. The shortcut application timing is also set in accordance with the type of the target appliance 200.

Step S3:
The operator sets "default entries ENT-D" in the flow table TBL of the target switch 100. In this example, two default entries, a first default entry ENT-D1 and a second default entry ENT-D2, are set. The first default entry ENT-D1 indicates that a packet addressed to the target appliance 200 is to be transferred to the target appliance 200. The second default entry ENT-D2 indicates that a packet received from the target appliance 200 is to be transferred to the controller 300.

2-2. Shortcut Setting Process

Figure 7:
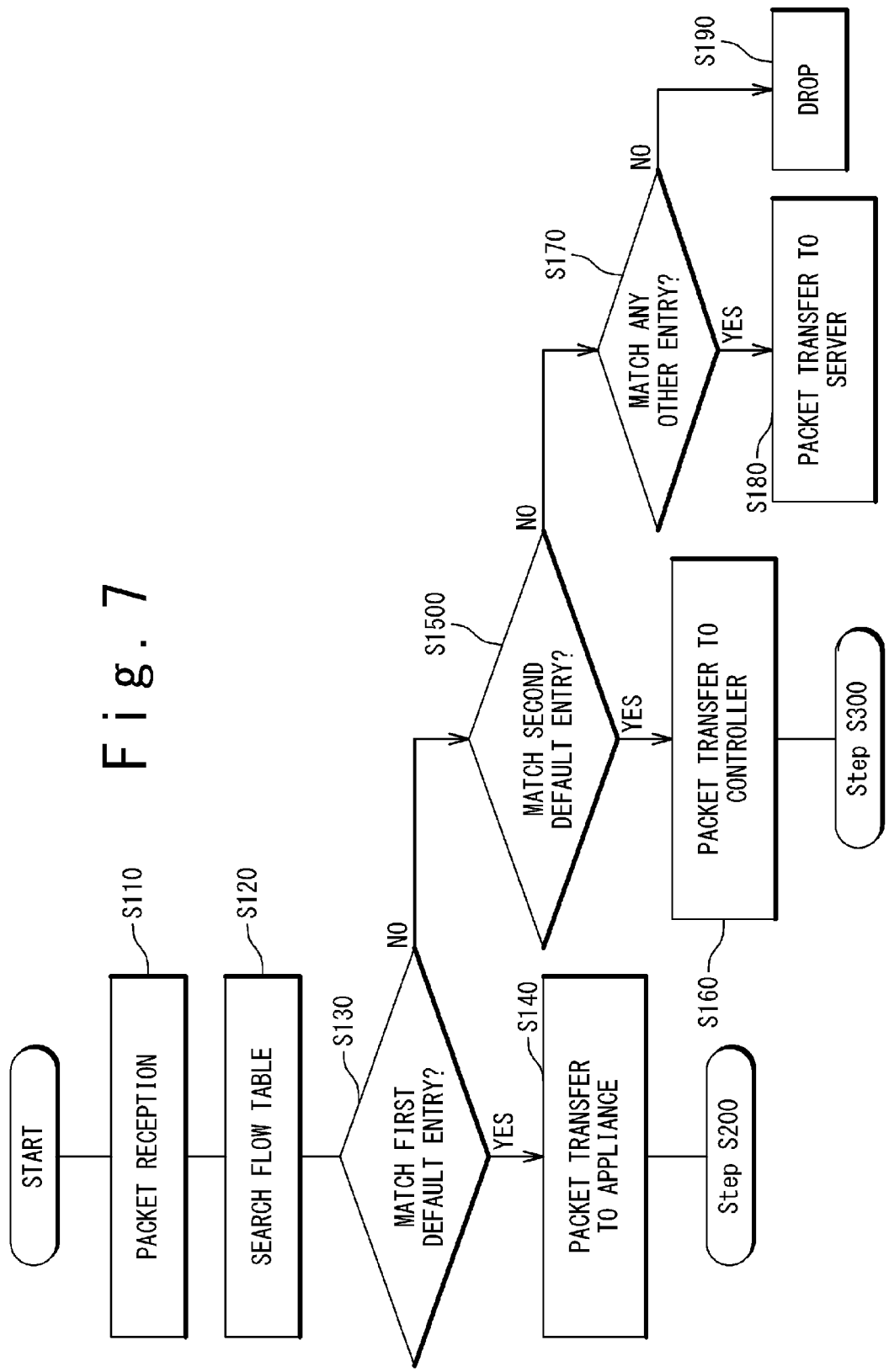
FIG. 7 is a flow chart showing a process performed by the switch (step S100) according to the present embodiment.
Figure 8:
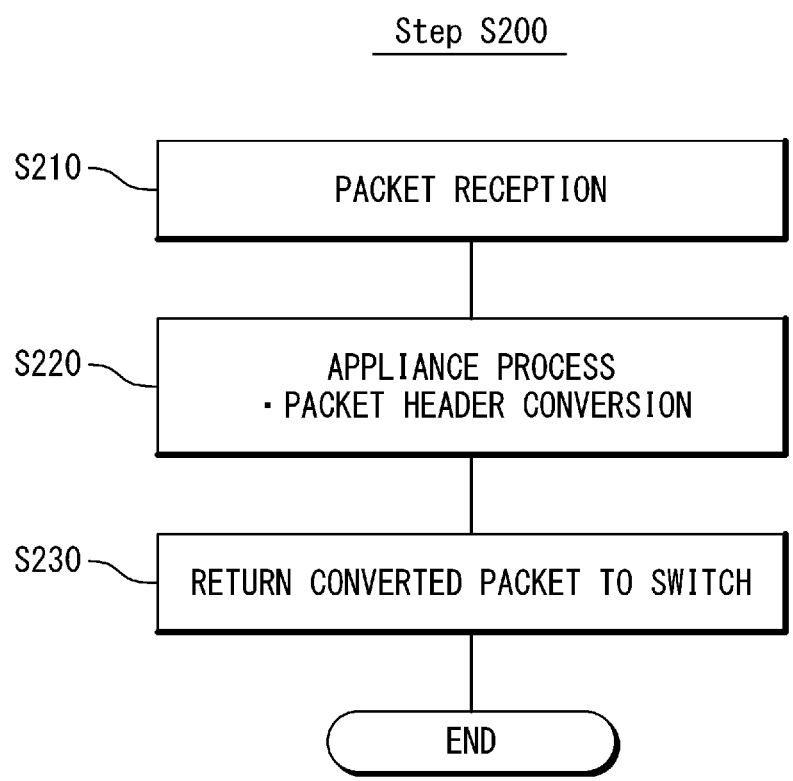
FIG. 8 is a flow chart showing a process performed by an appliance (step S200) according to the present embodiment.
Figure 9:
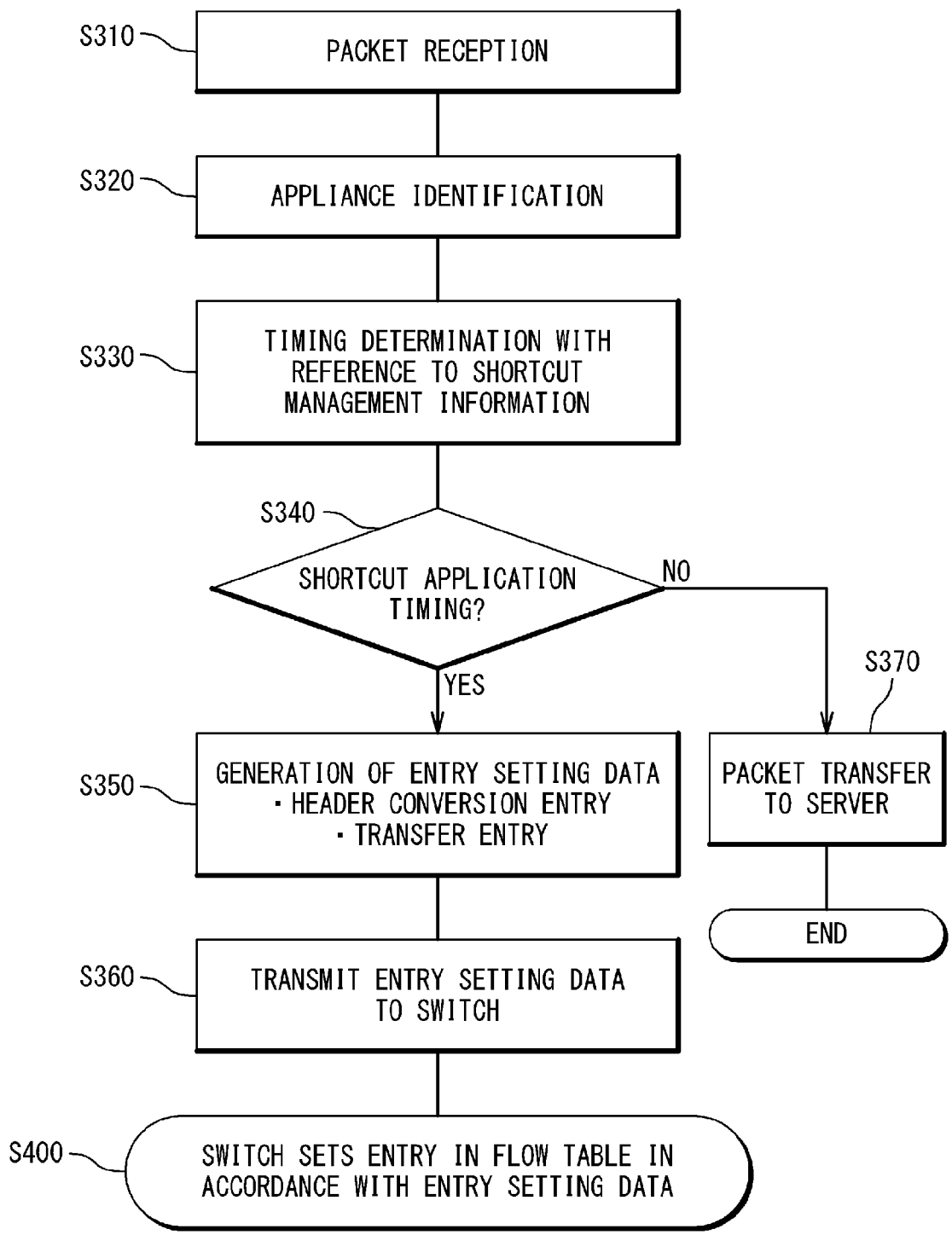
FIG. 9 is a flow chart showing a switch setting process performed by the controller (step S300) according to the present embodiment.

In the following, a description is given of a "shortcut setting process" according to the present embodiment. FIG. 7 is a flow chart showing the process performed by the switch 100 (step S100). FIG. 8 is a flow chart showing the process performed by the appliance 200 (step S200). FIG. 9 is a flow chart showing the process performed by the controller 300 (step S300).

First, the target switch 100 receives a packet of a certain flow (step S110). The switch processing section 110 of the target switch 100 searches the flow table (step S120). Here, the received packet is assumed as a predetermined packet addressed to the target appliance 200. In this case, the received packet matches the first default entry ENT-D1 in the flow table TBL (step S130: Yes). Thus, the switch processing section 110 transfers the received packet to the target appliance 200 in accordance with the first default entry ENT-D1 (step S140). When the received packet is sent from the target switch 100 to the target appliance 200, the process proceeds to step S200 executed by the target appliance 200.

The target appliance 200 receives a packet from the target switch 100 (step S210). In response to the received packet, the target appliance 200 executes the process as the appliance. At this time, the target appliance 200 carries out the packet header rewriting on the received packet in accordance with a predetermined rewriting mode (step S220). The packet generated as a result of the packet header rewriting is hereinafter referred to as "rewritten packet". That is, the target appliance 200 carries out the packet header rewriting on the received packet, thereby generating a rewritten packet. The target appliance 200 forwards the generated rewritten packet back to the target switch 100 (step S230).

The target switch 100 receives the rewritten packet from the target appliance 200 (step S110). The switch processing section 110 of the target switch 100 searches the flow table (step S120). In this case, the rewritten packet matches the second default entry ENT-D2 in the flow table TEL (step S130; No, step S150; Yes). Therefore, the switch processing section 110 transfers the rewritten packet to the controller 300 through the controller communication section 120 in accordance with the second default entry ENT-D2 (step S160). When the rewritten packet is sent from the target switch 100 to the controller 300, the process proceeds to step S300 executed by the controller 300.

At step S300, the controller 300 carries out the "switch setting process." First, the switch communication section 310 of the processing unit 301 receives (obtains) the rewritten packet from the target switch 100 through the communication device 303 (step S310). The switch communication section 310 forwards the obtained rewritten packet to the control section 320. The control section 320 recognizes that the source of the rewritten packet is the target appliance 200 based on the header information of the rewritten packet (step S320).

Next, the control section 320 reads the shortcut management information SCM related to the target appliance 200 from the storage device 320. Then, the control section 320 determines whether the current time is the "shortcut application timing" or not by referring to the shortcut management information SCM (step S330). In other words, the control section 320 refers to the shortcut management information SCM, thereby determining whether or not the rewritten packet of this time meets the predetermined condition indicated by the shortcut application timing. For the load balancer described above, for example, the shortcut application timing is "the time when the first packet of a certain flow is received." Therefore, when the rewritten packet received this time is the first packet of the flow to which the packet belongs, it can be said that the condition is satisfied.

If the current time is not the shortcut application timing (step S340; No), the control section 320 sends the rewritten packet to the destination in accordance with the packet header (step S370).

When the current time is the shortcut application timing (step S340; Yes), on the other hand, a new entry necessary for achieving the shortcut is set in the flow table TEL of the target switch 100. The control section 320 thus generates the entry setting data SET which instructs to set the new entry necessary for the shortcut (step S350). At this time, the control section 320 reads and refers to the connection information CON and the shortcut management information SCM from the storage unit 302. Furthermore, the control section 320 refers to the header information of the rewritten packet, and obtains the destination address of the rewritten packet. The control section 320 then designs a required new entry based on the pieces of information such as the shortcut management information SCM indicating the rewriting mode of the target appliance 200, the header information containing the destination address of the rewritten packet, and the connection information CON.

The new entry necessary for the shortcut is the entry that instructs "to transfer a packet belonging to the same flow as the predetermined packet received by the target switch 100 to the destination of the rewritten packet without being routed through the target appliance 200." Such a new entry includes, for example, a header rewriting entry ENT-HC and a transfer entry ENT-TR.

The header rewriting entry ENT-HC instructs "to rewrite the header information of a packet belonging to the same flow as the predetermined packet received by the target switch 100 so as to be equivalent to the packet header rewriting to be performed by the target appliance 200." In order to design such a header rewriting entry ENT-HC, the header information of the rewritten packet and the rewriting mode of the target appliance 200 indicated by the shortcut management information SCM is referred to.

On the other hand, the transfer entry ENT-TR instructs "to output a packet belonging to the same flow as the predetermined packet received by the target switch 100 to an output port linked to the destination of the rewritten packet." In order to design such a transfer entry ENT-TR, the header information of the rewritten packet and the connection information CON is referred to.

Furthermore, the priorities of these new entries ENT-HC and ENT-TR are individually designed to be higher than those of the above-mentioned default entries ENT-D1 and ENT-D2.

The control section 320 instructs the switch communication section 310 to transmit the generated entry setting data SET to the target switch 100. The switch communication section 310 transmits the entry setting data SET to the target switch 100 through the communication device 303 (step S360).

At step S400, the target switch 100 receives the entry setting data SET from the controller 300. The switch processing section 110 of the target switch 100 adds the new entries ENT-HC and ENT-TR to the flow table TEL in accordance with the entry setting data SET. The priorities of these new entries ENT-HC and ENT-TR are individually higher than those of the above-mentioned default entries ENT-D1 and ENT-D2.

From then on, when the target switch 100 receives a packet belonging to the same flow (steps S110, S120), the received packet matches the new entries ENT-HC and ENT-TR in the flow table TEL (step S130; No, step S150; No, step S170; Yes). In this case, the switch processing section 110 rewrites the header information of the received packet in accordance with the new entries ENT-HC and ENT-TR to output to the specified output port (step S180). This results in that the packets of the relevant flow are transferred directly from the target switch 100 to the destination server without being routed through the target appliance 200. That is, the "shortcut" is achieved with regard to the flow.

It should be noted that, in the process flow shown in FIG. 7, the switch processing section 110 discards the received packet (step S190) when the received packet does not match any of the entries ENT in the flow table TEL (step S170; No.). Note that the process is not limited to this.

3. Specific Examples

3-1. First Example

Figure 10:
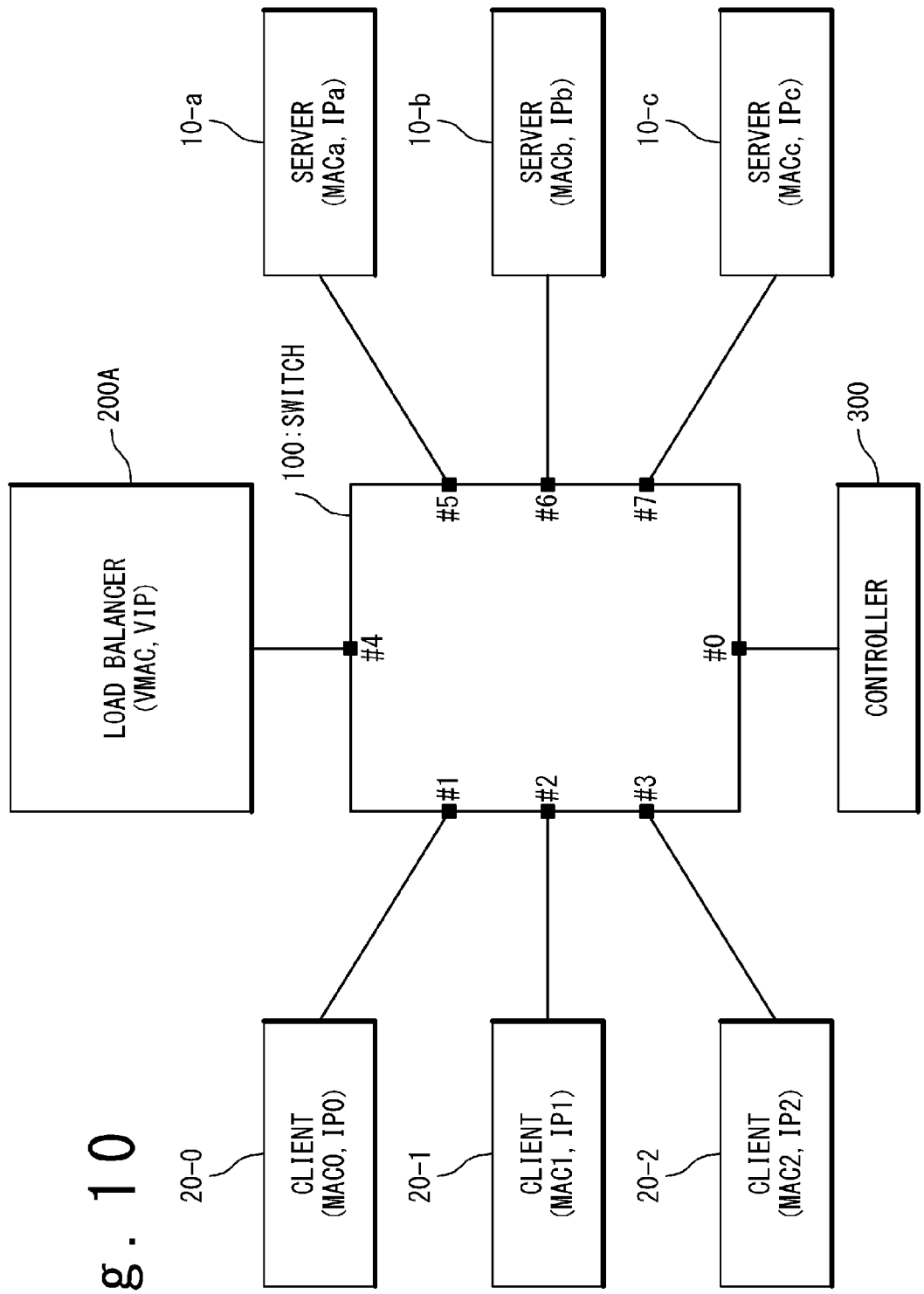
FIG. 10 shows the network configuration in a first example of the present embodiment.

FIG. 10 shows the network configuration in a first example. The target appliance 200 is a load balancer 200A in a DSR-configured network. The packet rewriting mode to be performed by this load balancer 200A is the MAT mode. In the initial setting process, the load balancer 200A is physically connected to "port 4" of a switch 100. The shortcut management information SCM with regard to the load balancer 200A is as follows:

Appliance name: Load balancer 200A
Connection port: Port 4 of the switch 100
Packet header rewriting mode: MAT
Shortcut application timing: At the time when the first packet arrives As shown in FIG. 10, the controller 300 is connected to port 0 of the switch 100. A client 20-0 (MAC address=MAC0, IP address=IP0), a client 20-1 (MAC address=MAC1, IP address=IP1), and a client 20-2 (MAC address=MAC2, IP address=IP2) are connected to ports 1, 2 and 3 of the switch 100, respectively. The load balancer 200A (MAC address=VMAC, IP address=VIP) is connected to port 4 of the switch 100. A server 10-*a* (MAC address=MACa, IP address=IPa, Loopback address=VIP), a server 10-*b* (MAC address=MACb, IP address=IPb, Loopback address=VIP), and a server 10-*c* (MAC address=MACc, IP address=IPc, Loopback address=VIP) are connected to port 5, 6 and 7 of the switch 100, respectively. In addition, the loopback address=VIP of the server 10 is a setting specific to the load balancer 200A in the DSR-configured network, which is a setting for receiving packets addressed to the VIP.

For such a network configuration, the first default entry ENT-D1 and the second default entry ENT-D2 which are set in the flow table TBL of the switch 100 are as shown in FIG. 11. The first default entry ENT-D1 instructs that packets addressed to the load balancer 200A (Destination IP address=VIP) are transferred to the load balancer 200A (Output port=port 4). The second default entry ENT-D2 instructs that the received packets from the load balancer 200A (Input port=port 4) are transferred to the controller 300.

Let us consider a case in which the client 20-1 transmits a TCP packet having header information given below to the load balancer 200A:

Destination MAC address=VMAC
    Source MAC address=MAC1
    Destination IP address=VIP
    Source IP address=IP1
    Destination TCP port number=80
    Source TCP port number=p0

The switch 100 receives the first packet of a flow of interest from port 2 which is linked to the client 20-1. The received packet matches the first default entry ENT-D1 shown in FIG. 11 (step S130; Yes). Thus, the switch 100 outputs the received packet from the port 4 in accordance with the first default entry ENT-D1 (step S140). The port 4 is linked to the load balancer 200A, and the load balancer 200A receives this packet.

The load balancer 200A performs a process as an appliance (step S200). Here, it is assumed that the load balancer 200A selects a server 10-*a* (MAC address=MACa) from a plurality of servers 10 as the destination. The load balancer 200A rewrites the destination MAC address of the received packet from "VMAC" to "MACa" in accordance with the predetermined rewriting mode (MAT). The header information of the rewritten packet obtained thereby is as follows.

Destination MAC address=MACa
    Source MAC address=MAC1
    Destination IP address=VIP
    Source IP address=IP1
    Destination TCP port number=80
    Source TCP port number=p0

The load balancer 200A forwards the rewritten packet back to the switch 100. The switch 100 receives the rewritten packet from port 4 communicating with the load balancer 200A. Therefore, the rewritten packet matches the second default entry ENT-D2 shown in FIG. 11 (step S150; Yes). In this case, the switch 100 transfers the rewritten packet to the controller 300 in accordance with the second default entry ENT-D2 (step S160).

The controller 300 recognizes that the source of the rewritten packet is the load balancer 200A when receiving the rewritten packet (step S320). For example, the controller 300 obtains from the packet header the information indicating that "port 4 is the input port of the switch 100 to which the rewritten packet is inputted." The controller 300 checks this information against the shortcut management information SCM, thereby recognizing the load balancer 200A as the source of the rewritten packet.

Then, the controller 300 refers to the shortcut management information SCM related to the load balancer 200A to determine that "the current time is the shortcut application timing" and generates a necessary entry setting data SET (step S350). Specifically, the controller 300 designs the header rewriting entry ENT-HC and the transfer entry ENT-TR as shown in FIG. 12 based on the shortcut management information SCM related to the load balancer 200A, the header information of the rewritten packet, and the connection information CON.

The "matching conditions" of the header rewriting entry ENT-HC and the transfer entry ENT-TR can be designed on the basis of the header information of the rewritten packet and the address of the load balancer 200A (VMAC, IP1). It should be noted that the source MAC address MAC1 can be obtained from an ARP request to the IP address IP1. Instead, the source MAC address MAC1 may be set to "Any (*)". Furthermore, "input port (IN PORT): 2" indicates the port of the switch 100 linked to the source address (MAC1, IP1), which can be obtained by referring to the connection information CON.

The "action" of the header rewriting entry ENT-HC is "to rewrite the destination MAC address to MACa." This can be designed on the basis of the packet header rewriting mode indicated in the shortcut management information SCM (=MAT type), and the destination MAC address of the rewritten packet (=MACa).

The "action" of the transfer entry ENT-TR is "to output the packet to the output port 5." The output port 5 is the port of the switch 100 linked to the destination MAC address of the rewritten packet (=MACa), which can be obtained by referring to the connection information CON.

Furthermore, the priorities of these new entries ENT-HC and ENT-TR are individually designed to be higher than those of the default entries ENT-D1 and ENT-D2.

The controller 300 transmits the entry setting data ENT which instruct to set the designed new entries ENT-HC and ENT-TR to the switch 100 (step S360). The switch 100 adds the new entries ENT-HC and ENT-TR to the flow table TEL, as shown in FIG. 12 (step S400).

From then on, packets of the flow transmitted from the client 20-1 to the load balancer 200A are directly transferred from the switch 100 to the destination server 10-*a* without being routed through the load balancer 200A. That is, the shortcut is achieved with regard to the traffic routed through the load balancer 200A.

It should be noted that when the DSR configuration is used, the packet are transferred from the server 10-*a* to the client 20-1 by way of an existing routing mode, since the traffic from the server 10-*a* to the client 20-1 is not routed through the load balancer 200A.

3-2. Second Example

Figure 13:
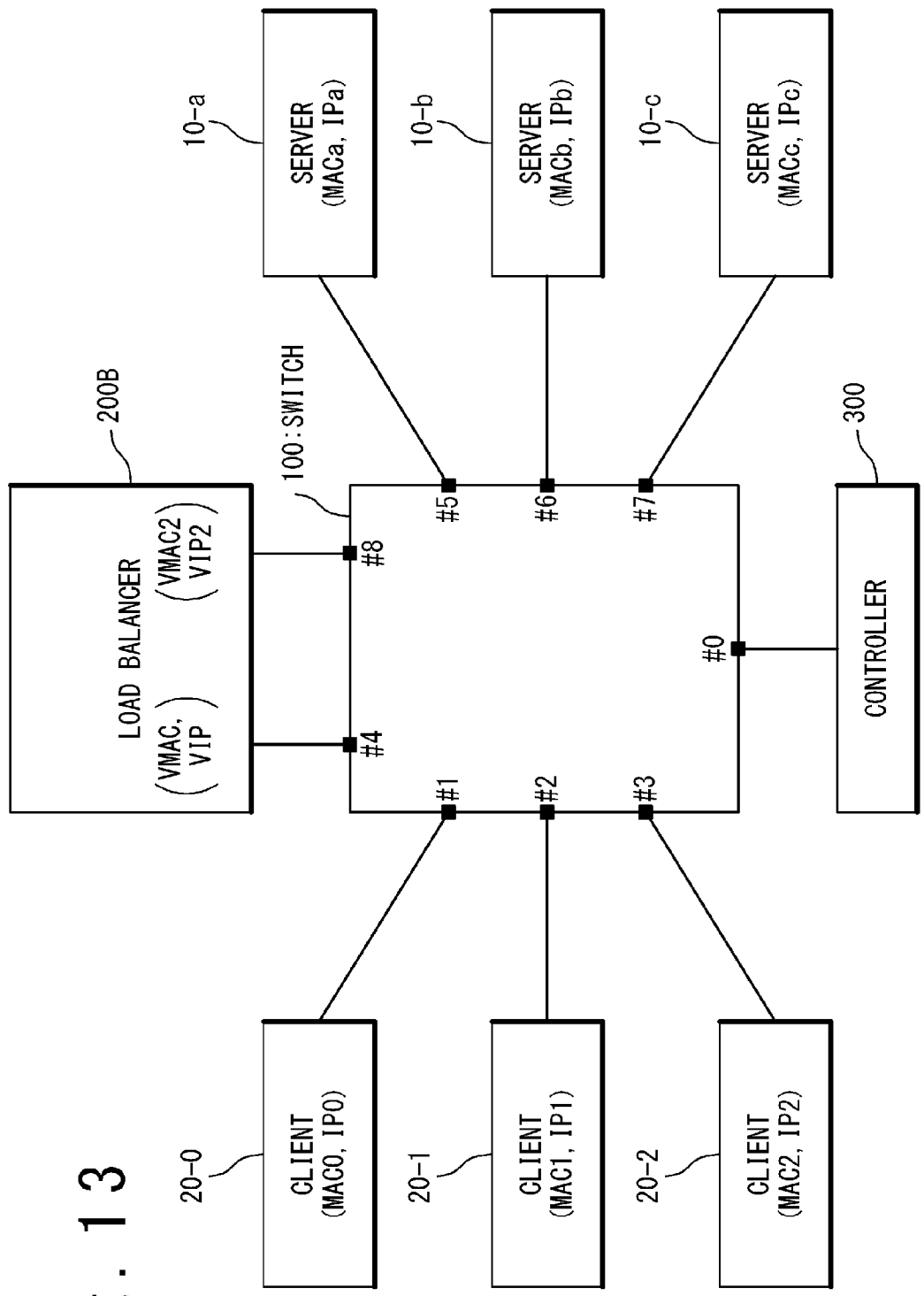
FIG. 13 shows the network configuration in a second example of the present embodiment.

FIG. 13 shows the network configuration in a second example. The descriptions overlapping with the case of the first example described above will be omitted if appropriate.

In the second example, the target appliance 200 is a load balancer 200B whose packet rewriting mode is the NAT type. When an NAT configuration is used, the load balancer 200B often has two or more network interfaces. In the example shown in FIG. 13, two network interfaces are assigned to (MAC address=VMAC, IP address=VIP) and (MAC address=VMAC2, IP address=VIP2). These two network interfaces are connected to port 4 and port 8 of the switch 100, respectively. The shortcut management information SCM related to this load balancer 200B is as follows.

Appliance name: Load balancer 200B
    Connection port: Port 4 of the switch 100 (Client side)
    Connection port: Port 8 of the switch 100 (Server side)
    Packet header rewriting mode: NAT (DNAT)
    Shortcut application timing: At the time when the first packet arrives FIG. 14 shows the first default entry ENT-D1 and the second default entry ENT-D2 set in the flow table TBL of the switch 100. The first default entry ENT-D1 indicates that a packet addressed to the load balancer 200B (Destination IP address=VIP) is to be transferred to the load balancer 200B (Output port=port 4). The second default entry ENT-D2 designates that a packet received from the load balancer 200B (Input port=port 8) is to be transferred to the controller 300.

Similarly to the first example, let us consider a case where the client 20-1 transmits a TCP packet to the load balancer 200B. Furthermore, it is assumed that the load balancer 200B selects the server 10-a (MAC address=MACa, IP address=IPa) from a plurality of servers 10 as the destination. The load balancer 200B rewrites the destination MAC address, the source MAC address, the destination IP address, and the destination port number of the received packet in accordance with the predetermined rewriting mode (NAT).

FIG. 15 shows new entries added in this example. A header rewriting entry ENT-HC1 and a transfer entry ENT-TR1 are the new entries for transferring packets received from the client 20-1 to the destination server 10-a without being routed through the load balancer 200B. Furthermore, when an NAT configuration is used, the traffic returning from the server 10-a is also routed through the load balancer 200B. The "shortcut" can be also achieved with regard to the returning traffic. Specifically, a header rewriting entry ENT-HC2 and a transfer entry ENT-TR2 are the new entries for transferring packets received from the server 10-a to the client 20-1 without being routed through the load balancer 200B. The design method of each of the new entries is similar to that in the case of the first example, so that the description thereof is omitted.

3-3. Third Example

Figure 16:
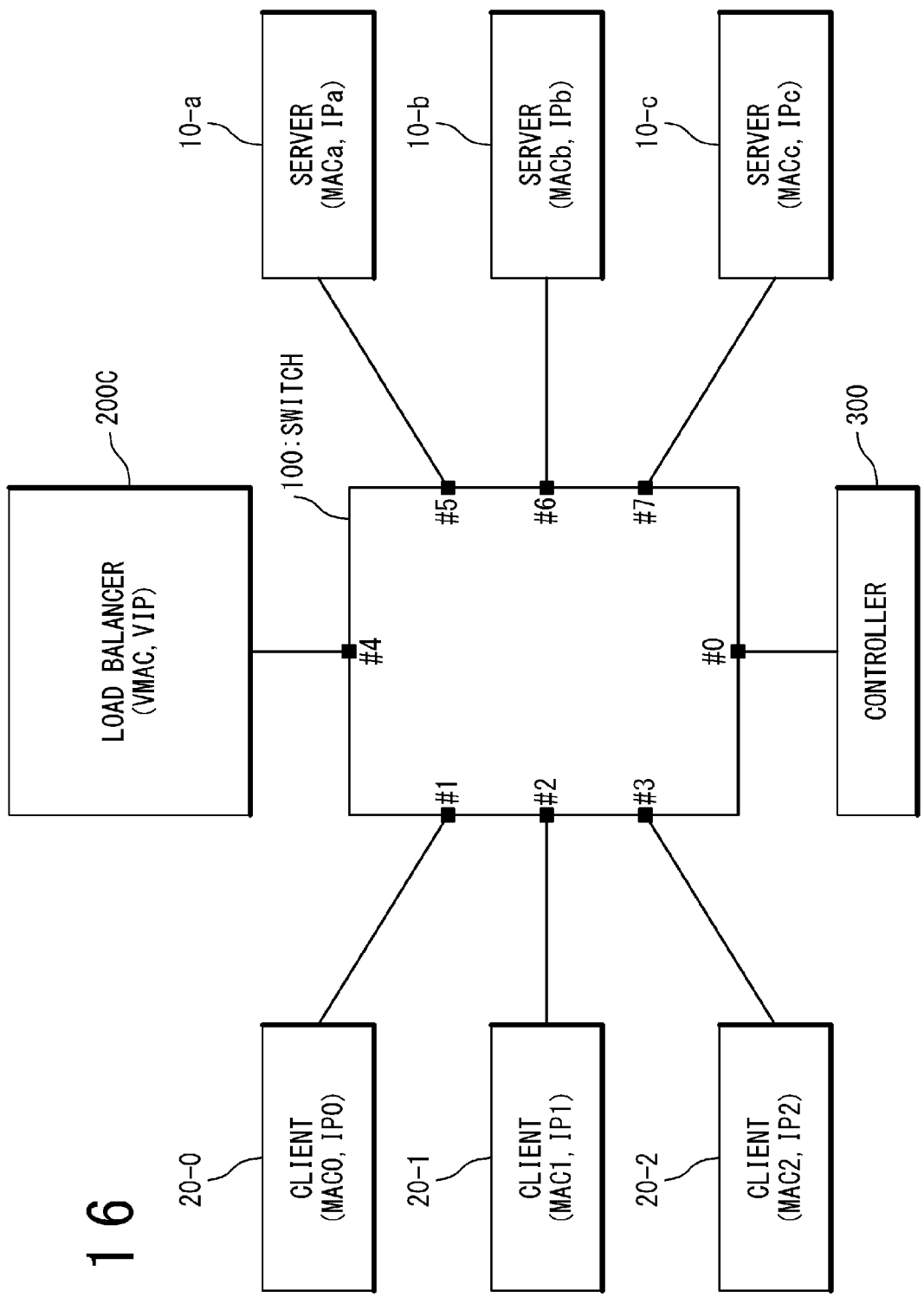
FIG. 16 shows the network configuration in a third example of the present embodiment.

FIG. 16 shows the network configuration in a third example. In the third example, the target appliance 200 is a firewall 200C that carries out a stateful operation. The packet rewriting mode by the firewall 200C is the NAT mode. In the initial setting process, the firewall 200C is physically connected to "port 4" of the switch 100. The shortcut management information SCM related to the firewall 200C is as follows:

Appliance name: Firewall 200C
Connection port: Port 4 of the switch 100
Packet header rewriting mode: NAT
Shortcut application timing: when an SYN-ACK packet is received In this example, the shortcut application timing is a timing when an SYN-ACK packet is received. Therefore, the controller 300 generates necessary entry setting data SET when receiving an SYN-ACK packet, and transmits the entry setting data SET to the switch 100. The other operations are similar to those in the already-described example.

It should be noted the controller 300 may receive all the packets until the controller 300 receives an SYN-ACK packet. Instead, only an SYN-ACK packet may be transmitted to the controller 300 by registering the transfer from the firewall 200C to the server 10 as an entry at the time of registering the default entry ENT-D.

In addition, a firewall that carries out the stateless process, an intrusion prevention system (IPS), an intrusion Detection System (IDS) and the like may be defined as the target appliance 200.

4. Modified Example

In a modification example of the present embodiment, the second default entry ENT-D2 is not set in the flow table TBL of the target switch 100 at step S3 at the time of the initial setting.

FIG. 17 is a flow chart showing a process performed by the switch 100 (step S100) in the present modified example. Compared with the case which has been already shown in FIG. 7, step S150 is omitted. Instead, when a received packet does not match any of the entries ENT in the flow table TBL (step S170; No), the switch processing section 110 transfers the packet to the controller 300 (step S160).

Let us consider a case where the target switch 100 receives the rewritten packet from the target appliance 200 in the shortcut setting process described above. In this modified example, the flow table TEL does not have the second default entry ENT-D2. Therefore, there is no entry in the flow table TBL that matches the rewritten packet received from the target appliance 200 (step S170; No). Therefore, the switch processing section 110 transfers the rewritten packet to the controller 300 (step S160). Then, step S300 is implemented similarly.

5. Advantageous Effect

As described above, the packet header rewriting to be carried out by the appliance 200 can be set as an entry in the flow table TEL according to the present embodiments. This enables the switch 100 to perform the process of the appliance 200 instead. In other words, it is possible to control the traffic originally routed through a certain appliance 200 not to be routed through the appliance 200 after a certain timing. Such a shortcut reduces the processing load imposed on the appliance 200. Also, it is possible to suppress the performance required for the appliance 200, which leads to cost reduction.

Furthermore, it is not necessary to remodel the appliance 200 in order to achieve the shortcut in the present embodiment. The shortcut related to the traffic originally routed through the appliance 200 can be achieved without remodeling of the appliance 200. This allows using existing appliance equipment, thereby reducing development costs.

Although embodiments of the present invention have been described above referring to the attached drawings, the present invention is not limited to the embodiments described above, but can be appropriately modified by the person skilled in the art without departing from the spirit thereof.

This application claims the priority on the basis of Japanese Patent Application No. 2010-000459 filed on Jan. 5, 2010, the disclosure of which is incorporated herein by reference.

What is claimed is:

1. A network system, comprising:
an appliance configured to perform a packet header rewriting for rewriting header information of packets in accordance with a predetermined rewriting mode;
a controller including a storage unit being non-transitory in which shortcut management information indicating said predetermined rewriting mode and a predetermined condition is stored; and
a switch connected to said appliance and said controller,
wherein said switch includes a flow table,
wherein each entry in said flow table specifies an action to be carried out on a packet matching a matching condition;
wherein said switch is configured to refer to said flow table upon receiving a packet and to perform an action specified by an entry that matches said received packet on said received packet,
wherein said switch transfers a predetermined packet to said appliance, wherein said appliance generates a rewritten packet by carrying out said packet header rewriting on said predetermined packet and forwards said rewritten packet back to said switch, wherein said switch transfers said rewritten packet received from said appliance to said controller, said controller refers to said shortcut management information in response to said rewritten packet, wherein, in a case when said rewritten packet meets said predetermined condition, said controller generates entry setting data which instructs to set a new entry on the basis of a destination of said rewritten packet and said predetermined rewriting mode, and sends said entry setting data to said switch, wherein said new entry indicates that packets belonging to the same flow as said predetermined packet are transferred to said destination without being routed through said appliance, and wherein said switch adds said new entry to said flow table in accordance with said entry setting data received from said controller.

2. The network system according to claim 1, wherein said flow table includes a first default entry which instructs to transfer packets addressed to said appliance to said appliance, and wherein said predetermined packet matches said first default entry and said switch transfers said predetermined packet to said appliance in accordance with said first default entry.

3. The network system according to claim 2, wherein said flow table further includes a second default entry which instructs to transfer packets received from said appliance to said controller, and wherein said switch transfers said rewritten packet received from said appliance to said controller in accordance with said second default entry.

4. The network system according to claim 2, wherein said switch is adapted to transfer said received packet to said controller, when said flow table does not include an entry which matches said received packet, and wherein said flow table does not include an entry which matches said rewritten packet received from said appliance.

5. The network system according to claim 1, wherein said appliance comprises a load balancer, and wherein said predetermined condition comprises an event in which said rewritten packet is the first packet of a flow which said rewritten packet belongs to.

6. The network system according to claim 1, wherein said predetermined rewriting mode is selected from MAT "MAC address translation", NAT "network address translation) and NAPT "Network Address Port Translation".

7. A controller controlling a network in which a switch and an appliance are provided, said switch including a flow table, each entry in said flow table specifying an action to be carried out on a packet matching a matching condition, said switch being adapted to refer to said flow table upon receiving a packet and to perform an action specified by an entry that matches said received packet on said received packet, said switch being adapted to set an entry of said flow table in accordance with entry setting data received from said controller, said appliance being adapted to perform a packet header rewriting for rewriting header information of packets in accordance with a predetermined rewriting mode, said switch transfers a predetermined packet to said appliance, said appliance generates a rewritten packet by carrying out said packet header rewriting on said predetermined packet and forwards said rewritten packet back to said switch, said switch transfers said rewritten packet received from said appliance to said controller, said controller comprising:
a storage unit in which shortcut management information indicating said predetermined rewriting mode and a predetermined condition is stored; and
a processing unit performing a switch setting process, wherein, in said switch setting process, said processing unit refers to said shortcut management information in response to said rewritten packet, in a case when said rewritten packet meets said predetermined condition, said processing unit generates entry setting data which instructs to set a new entry on the basis of a destination of said rewritten packet and said predetermined rewriting mode, and sends said entry setting data to said switch, and said new entry indicates that packets belonging to the same flow as said predetermined packet are transferred to said destination without being routed through said appliance.

8. A control method of a network in which a switch and an appliance is provided, said switch including a flow table, each entry in said flow table specifying an action to be carried out on a packet matching a matching condition, said switch being adapted to refer to said flow table upon receiving a packet and to perform an action specified by an entry that matches said received packet on said received packet, said appliance being adapted to perform a packet header rewriting for rewriting header information of packets in accordance with a predetermined rewriting mode, and said control method comprising:

transferring a predetermined packet from said switch to said appliance;

generating a rewritten packet in said appliance by carrying out a packet header rewriting on said predetermined packet to forward said rewritten packet back to said switch;

obtaining said rewritten packet from said switch;

reading shortcut management information indicating said predetermined rewriting mode and a predetermined condition from a storage device, in response to said rewritten packet;

generating entry setting data which instruct to set a new entry based on a destination of said rewritten packet and said predetermined rewriting mode when said rewritten packet meets said predetermined condition;

sending said entry setting data to said switch; and adding said new entry to said flow table in accordance with said entry setting data, in said switch, wherein said new entry indicates that a packet belonging to the same flow as said predetermined packet is transferred to said destination without being routed through said appliance.

9. A non-transitory recording medium recording a control program which causes a computer to perform a control process of a network in which a switch and an appliance is provided, said switch including a flow table, each entry in said flow table specifying an action to be carried out on a packet matching a matching condition, said switch being adapted to refer to said flow table upon receiving a packet and to perform an action specified by an entry that matches said received packet on said received packet, said appliance being adapted to perform a packet header rewriting for rewriting header information of packets in accordance with a predetermined rewriting mode, wherein a shortcut setting process is performed in which:

said switch transfers a predetermined packet to said appliance, said appliance generates a rewritten packet by carrying out said packet header rewriting on said predetermined packet and forwards said rewritten packet back to said switch, and said switch transfers said rewritten packet received from said appliance to said controller, wherein said control process includes:

reading shortcut management information indicating said predetermined rewriting mode and a predetermined condition from a storage device, in response to said rewritten packet;

generating entry setting data which instruct to set a new entry based on a destination of said rewritten packet and said predetermined rewriting mode when said rewritten packet meets said predetermined condition; and sending said entry setting data to said switch, and wherein said new entry indicates that a packet belonging to the same flow as said predetermined packet is transferred to said destination without being routed through said appliance.

10. The network system according to claim 1, wherein the controller and the switch provide a shortcut with regard to a traffic routed through the appliance.

11. The network system according to claim 1, wherein the controller and the switch controls a traffic originally routed through the appliance so as not to be routed through the appliance after a certain timing.

12. A network system, comprising:

an appliance configured to perform a packet header rewriting for rewriting header information of packets in accordance with a predetermined rewriting mode;

a controller including a storage unit in which shortcut management information indicating said predetermined rewriting mode and a predetermined condition is stored; and a switch including a flow table is connected to said appliance and said controller, wherein said appliance generates a rewritten packet by carrying out said packet header rewriting on said predetermined packet and forwards said rewritten packet back to said switch, wherein said controller generates entry setting data which instruct to set a new entry based on a destination of said rewritten packet and said predetermined rewriting mode when said rewritten packet meets said predetermined condition, wherein said controller sends said entry setting data to said switch, and wherein said switch adds said new entry to said flow table in accordance with said entry setting data.

13. The network system according to claim 12, wherein said new entry indicates that a packet belonging to a same flow as said predetermined packet is transferred to said destination without being routed through said appliance.

14. The network system according to claim 12, wherein said flow table includes a first default entry which instructs to transfer packets addressed to said appliance to said appliance.

15. The network system according to claim 14, wherein said predetermined packet matches said first default entry and said switch transfers said predetermined packet to said appliance in accordance with said first default entry.

16. The network system according to claim 14, wherein said flow table further includes a second default entry which instructs to transfer packets received from said appliance to said controller.

17. The network system according to claim 16, wherein said switch transfers said rewritten packet received from said appliance to said controller in accordance with said second default entry.

18. The network system according to claim 12, wherein said switch is configured to transfer said received packet to said controller, when said flow table does not include an entry which matches said received packet.

19. The network system according to claim 12, wherein said flow table does not include an entry which matches said rewritten packet received from said appliance.

20. The network system according to claim 12, wherein said appliance comprises a load balancer, and wherein said predetermined condition is an event in which said rewritten packet is the first packet of a flow which said rewritten packet belongs to.

* * * * *